(12) United States Patent
Siversson

(10) Patent No.: US 7,236,159 B1
(45) Date of Patent: Jun. 26, 2007

(54) HANDHELD OR POCKETSIZED ELECTRONIC APPARATUS AND HAND-CONTROLLED INPUT DEVICE

(75) Inventor: Per Siversson, Helsingborg (SE)

(73) Assignee: Spectronic AB, Helsingborg (SE)

( * ) Notice: Subject to any disclaimer, the term of this patent is extended or adjusted under 35 U.S.C. 154(b) by 0 days.

(21) Appl. No.: 09/914,463

(22) PCT Filed: Mar. 10, 2000

(86) PCT No.: PCT/SE00/00483

§ 371 (c)(1),
(2), (4) Date: Nov. 5, 2001

(87) PCT Pub. No.: WO00/55716

PCT Pub. Date: Sep. 21, 2000

(30) Foreign Application Priority Data

Mar. 12, 1999 (SE) .................................... 9900908

(51) Int. Cl.
*G09G 5/00* (2006.01)
*G06K 11/06* (2006.01)

(52) U.S. Cl. .................... 345/173; 345/169; 178/18.01

(58) Field of Classification Search ........ 345/156–178; 323/904; 178/18.01–20; 455/564, 569.1–569.2
See application file for complete search history.

(56) References Cited

U.S. PATENT DOCUMENTS

| | | | | | |
|---|---|---|---|---|---|
| 4,066,853 | A | * | 1/1978 | Zenk ........................... 200/512 |
| 4,320,573 | A | | 3/1982 | Larson |
| 5,543,588 | A | * | 8/1996 | Bisset et al. ............. 178/18.06 |
| 5,563,631 | A | * | 10/1996 | Masunaga ................... 345/169 |
| 5,677,711 | A | * | 10/1997 | Kuo ............................ 345/173 |
| 5,729,219 | A | * | 3/1998 | Armstrong et al. ......... 345/173 |
| 5,729,249 | A | * | 3/1998 | Yasutake ..................... 345/173 |
| 6,072,475 | A | * | 6/2000 | van Ketwich ............... 345/173 |
| 6,192,258 | B1 | * | 2/2001 | Kamada et al. ............. 455/566 |
| 6,426,736 | B1 | * | 7/2002 | Ishihara ...................... 345/102 |
| 6,473,069 | B1 | * | 10/2002 | Gerpheide ................... 345/157 |
| 6,559,831 | B1 | * | 5/2003 | Armstrong .................. 345/159 |
| 6,775,560 | B2 | * | 8/2004 | King et al. .................. 455/566 |
| 6,965,783 | B2 | * | 11/2005 | Pirkola et al. ........... 455/550.1 |
| 2002/0158838 | A1 | * | 10/2002 | Smith et al. ................. 345/156 |
| 2003/0071784 | A1 | * | 4/2003 | Sato et al. ................... 345/156 |

(Continued)

FOREIGN PATENT DOCUMENTS

EP 0 704 788 A2 4/1996

(Continued)

*Primary Examiner*—Richard Hjerpe
*Assistant Examiner*—M. Fatahiyar
(74) *Attorney, Agent, or Firm*—Finnegan, Henderson, Farabow, Garrett, & Dunner, L.L.P.

(57) ABSTRACT

A handheld or pocketsized electronic apparatus, such as a mobile telephone, having a display unit and a touch surface that is position-sensitive in a first and second direction for control of the electronic apparatus; the display unit having a display area taking up most of the front side of the apparatus and the touch surface being sufficiently narrow to fit on the side edge of the apparatus and curved in the first direction to convex shape, thus making it simple for a user to control the apparatus with one hand, without the display being hidden, and in an ergonomically correct manner, whereby control of the apparatus is attained without the use of a keyboard or similar input device.

17 Claims, 8 Drawing Sheets

U.S. PATENT DOCUMENTS

2003/0117376 A1 * 6/2003 Ghulam .................. 345/173

FOREIGN PATENT DOCUMENTS

| EP | 0704788 A2 | * | 4/1996 |
| GB | 2314 179 A | * | 12/1997 |
| GB | 2344 905 A | * | 6/2000 |
| GB | 2344905 A | * | 6/2000 |
| JP | 11-220523 | * | 10/1999 |
| WO | WO 98/08241 | | 2/1998 |

* cited by examiner

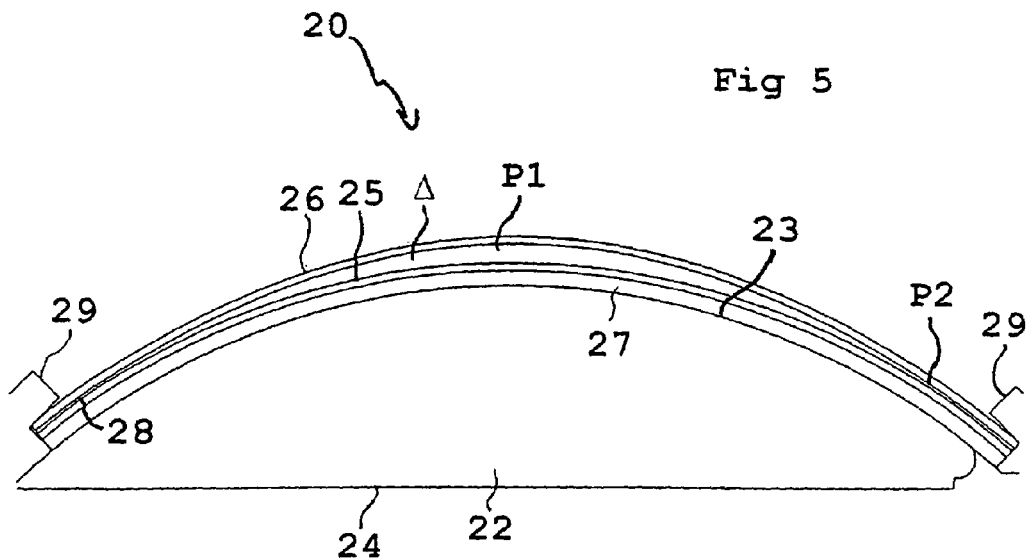
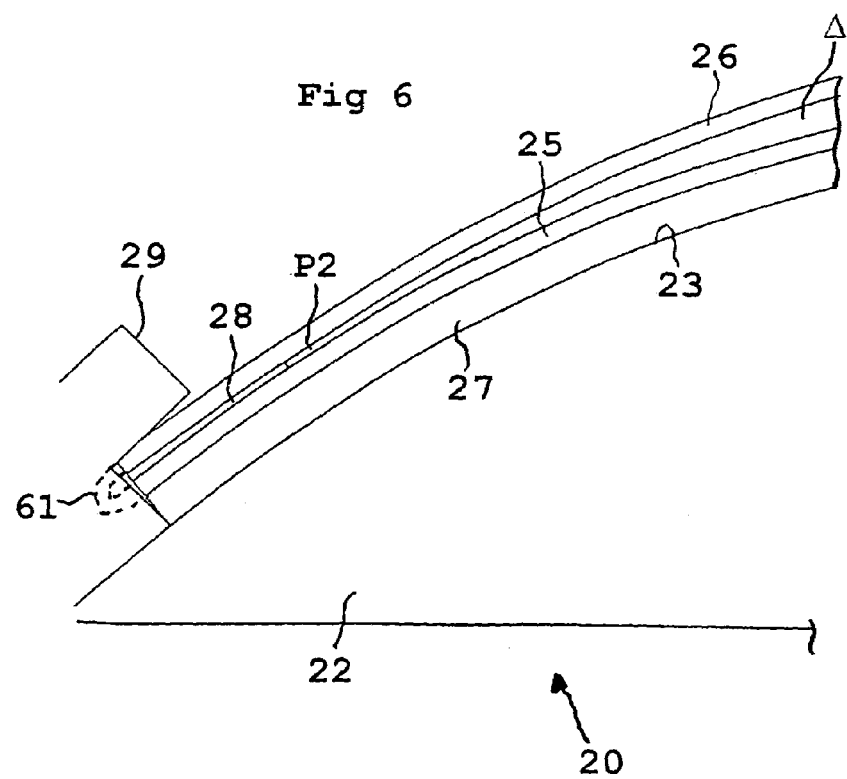

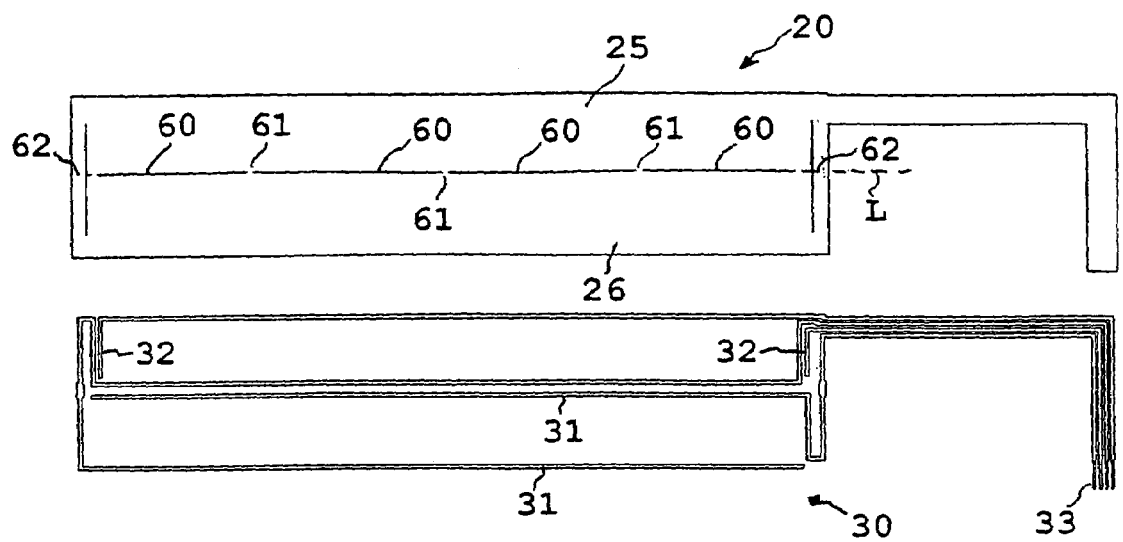
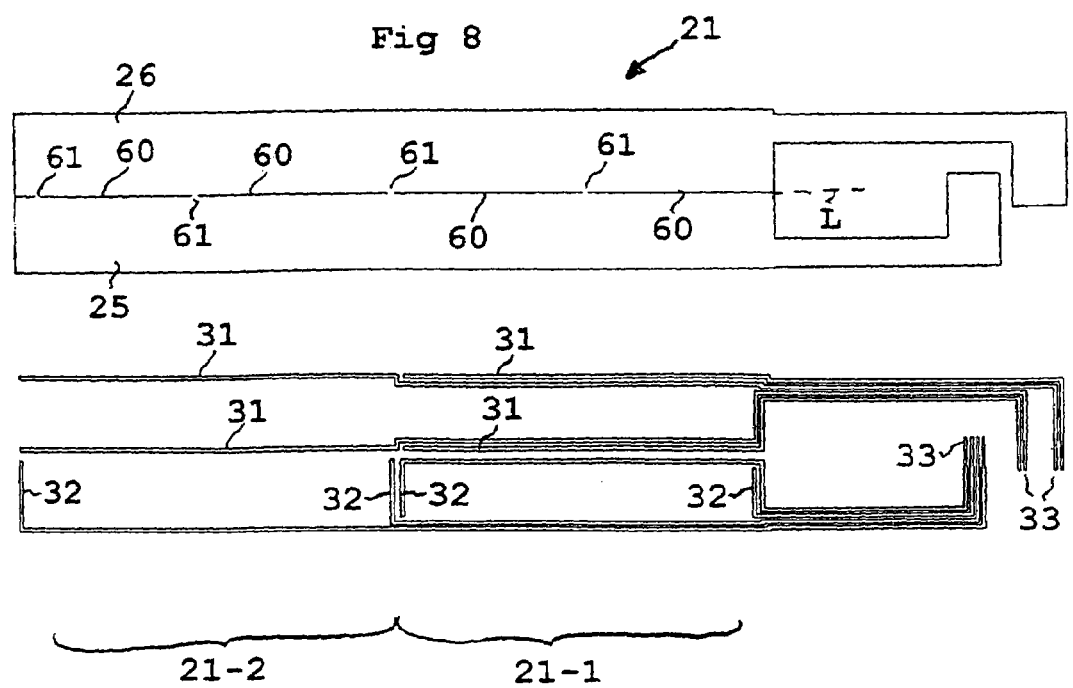

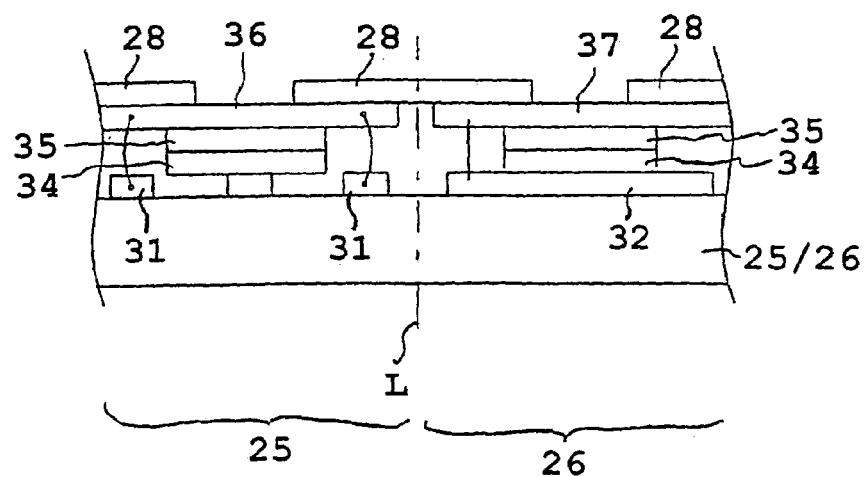
Fig 9
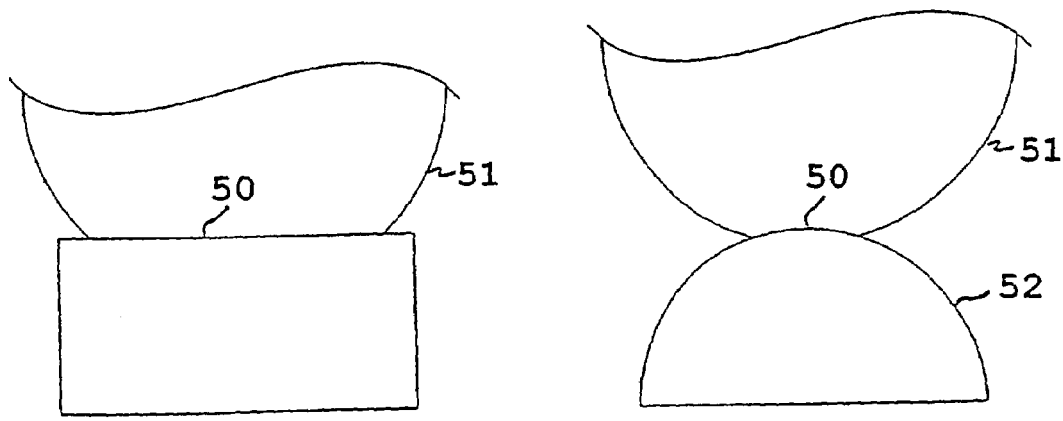
Fig 10a
Fig 10b

HANDHELD OR POCKETSIZED ELECTRONIC APPARATUS AND HAND-CONTROLLED INPUT DEVICE

TECHNICAL FIELD

The present invention relates to a handheld or pocketsized electronic apparatus, such as a mobile telephone, a handheld computer, etc., comprising a display unit and a touch surface that is position-sensitive in two directions for control of the apparatus. The invention also relates to a hand-controlled input device of touchpad type for use in such handheld electronic apparatus to provide a touch surface.

The invention has been developed especially for, and will be described in conjunction with, a combined mobile telephone and web browser, but is generally applicable to all types of handheld electronic apparatus where it is preferred to eliminate or reduce the number of conventional alphanumerical keyboards, individual physical function keys, a mouse, a handheld pointer pen, etc., for entering text, controlling a cursor, activating functions, etc.

BACKGROUND ART

It is known to control a handheld electronic apparatus or terminal, such as a mobile telephone or a handheld computer, by means of a conventional physical keyboard, individual physical alphanumerical keys and function keys, a thumb-wheel or a mouse. The use of keyboard and individual buttons integrated with the apparatus itself has the drawback that they are bulky per se and that space problems arise when the number of functions increases. Both a separate alphanumerical keyboard and a mouse have the drawbacks of constituting an extra component for the user and of requiring a separate work surface.

To alleviate these drawbacks electronic apparatus has been developed that can be at least partially controlled by means of a touchscreen and/or a touchpanel/touchpad. These input devices are available in analog or digital embodiments. Using a finger and/or a separate, handheld instrument—often termed "pen"—the user can select a point on the touch surface of the touchscreen or touchpanel for the purpose of selecting a corresponding point on the display area of the display unit. The user can thus activate various functions, such as "virtual" buttons for entering text, dialing numbers, activating functions, etc. Movement of a finger across the touch surface can result in a corresponding movement of a cursor across the display area of the display unit. However, no cursor need exist and instead the virtual function keys may be illuminated, for instance, when corresponding areas on the display area are activated.

A touchscreen is characterised in that it is transparent and entirely or partially covers the display area of the display unit. The user presses or clicks directly on the touch surface with his finger or with a pen, at the virtual buttons or fields indicated by the display unit, and no movable cursor is therefore necessary. A touchpanel or touchpad is characterised in that it does not coincide with the display area and is often used to control some form of cursor across the display area.

It is also known to make touchscreens and touchpads sensitive to the degree of pressure so that, by pressing sufficiently hard on the touch surface, a user can activate, i.e. "click on", a selected button or function.

Known touchscreens and touchpads can to a certain extent alleviate the above-mentioned drawbacks of alphanumerical keyboards, physical keys, mouse and thumb-wheel, but they entail several other problems:

1. A touchscreen impairs the contrast and resolution of the picture since it is applied in front of the display area. This problem is particularly manifest in reflective display units where the light passes twice through the touchscreen. It is particularly difficult to provide glass or plastic with the conducting layer necessary for function of the touchscreen, without the transparency of the touchscreen being impaired.
2. Another drawback with touchscreens is that a part of the display area is obscured by the user's own finger.
3. A further drawback with touchscreens and touchpads is that the positioning accuracy is limited as a result of the large dimension of the finger in relation to the touch surface, a drawback that is particularly manifest with small touch surfaces. This problem can be partially alleviated by using a separate, thin pen to replace the finger but this has the disadvantage of requiring an extra component for the user to keep track of. The drawback of poor contrast is not alleviated, however, and even a pen obscures the display area to a certain extent.
4. Another important drawback of touchscreens is that they become dirty or scratched by the finger being passed over the surface, which further impairs visibility. Placing a separate scratch protection layer on top of the touchscreen is no solution since it would further impair the contrast.
5. A general drawback with pressure-sensitive touchscreens is that the touch surface must be flexible in its depth direction and the display area as a whole therefore becomes sensitive to external influence.
6. A touchscreen or touchpad is normally constructed from two layers held at a relative distance from each other by edge spacers. A problem is that the outer layer, constituting the touch surface, is tensioned and is therefore stretched when pressed. This problem is particularly prominent when the distance between the edge spacers is small, and especially close to these. This also entails the drawback that the pressure-sensitivity varies across the touch surface.

U.S. Pat. No. 5,729,219 (Motorola Inc.) describes a handheld pager having a casing, a display unit arranged on the front of the casing and a flat touch surface parallel to the display area of the display unit on the opposite, rear side of the casing. The distance between the screen and the parallel touch surface is equal to the thickness of the casing. The screen and touch surface are equal in size and movement of the user's finger across the panel from left to right results in a corresponding left-to-right movement of a cursor on the screen, and vice versa. A finger movement on the touch surface results in a cursor movement of equal distance on the screen.

SUMMARY OF THE INVENTION

The object of the present invention is to eliminate or at least reduce one or more of the drawbacks of known touchscreens and touchpanels described above.

To achieve this purpose, a first aspect of the invention provides a handheld or pocketsized electronic apparatus, such as a mobile telephone, comprising a display unit and a touch surface that is position-sensitive in a first and a second direction for control of the electronic apparatus, which apparatus is characterised in that the display unit has a display area taking up most of a front side of the apparatus and in that the touch surface is arranged at an edge side of the apparatus and is curved in the first direction to convex shape.

The term "touch surface" here means a surface on a touchpanel (of touchpad type) across which a user may pass his finger to a desired position in order to guide a cursor, for instance, across the display area of the display unit and/or to activate virtual keys shown on the display area, etc. These basic functions of a touchpanel are known per se to a person skilled in the art and need not therefore be described in further detail.

Normally the movement of a finger in the two directions of the touch surface corresponds to a positioning on the display area of the display unit in two directions at right angles to each other, preferably parallel to the direction of movement of the finger on the touch surface.

A particular advantage with the touch surface, in accordance with the invention, being arranged on an edge side of the apparatus is that the apparatus can easily be controlled using one hand, while the apparatus is held in a manner natural to a user studying an object held in the hand. Furthermore, from an ergonomic point of view control of the apparatus is effected in an advantageous manner. In addition, the apparatus has none of the problems of known touchscreens described above in the way of poor resolution and contrast or dirtying, while at the same time the invention solves the problem of the display area being partially obscured by the user's finger or a pen. The display unit can also be made hard and less sensitive to external influence.

Another advantage of the invention is that the display is large in relation to the size of the apparatus. This means that the display can be used to present detailed information, graphics or the like, and that at the same time the apparatus can be relatively small in size.

An advantage of the touch surface according to the invention being curved to convex shape in a first direction is illustrated schematically in FIGS. 10a and 10b. The contact area 50 between the tip of the finger 51 and the curved touch surface 52 (FIG. 10b) will be formed according to the invention by two convex surfaces instead of, as in the known technology (FIG. 10a), by one convex surface (finger tip) and one flat, uncurved touch surface. The invention greatly reduces the contact area between finger tip and touch surface, thus enabling high positioning accuracy to be achieved in the width direction of the touch surface, even with a relatively narrow, longish touch surface.

Another advantage of reducing the contact area between finger and touch surface is that less force is required for the user to achieve the same force per surface unit for activation of the touch surface. This is also clear from FIG. 10b.

Another advantage of the invention is that the touch surface can be designed in such a manner that the user does not need to move his finger so much in the direction in which the surface is curved (direction of curvature). In certain cases the finger may not even have to be moved or slide over the arched surface in the direction of curvature, but just "roll" over the arched surface.

In accordance with preferred embodiments of the invention the apparatus can be controlled as follows: If, for instance, the curved touch surface runs along the right side edge of the apparatus, and the user holds the apparatus in his right hand with the palm facing the rear of the apparatus, the user can operate the apparatus by moving his thumb along and across the curved touch surface on the right side edge. Obviously the curved touch surface may instead run along the left side edge and the apparatus be operated with any preferred finger. If the apparatus is provided with curved touch surfaces on both right and left side edges of the apparatus objects on the display can be controlled in three dimensions. Functions for turning objects in three dimensions can be implemented, for instance. The object can then be turned about an axis at right angles to the display by the user moving his fingers along both touch surfaces in longitudinal direction of the apparatus, the finger that is moved along the left touch surface being moved in opposite direction to the finger being moved along the right touch surface. In similar manner the object can be turned about the longitudinal direction of the apparatus by moving the fingers on each touch surface transversely across the touch surface and in opposite direction to each other. Furthermore the object can be turned about the transverse direction of the apparatus by moving the fingers on each side in the longitudinal direction of the touch surfaces and in the same direction.

An important advantage of the invention as regards embodiments of membrane type is that a curved touch surface of a certain membrane gives less resistance to depression since the membrane forming the touch surface need not be stretched. The required activation force is thus less than with known touch surfaces. In known touch surfaces the activation force required increases the nearer one comes to the edge and this means that the accuracy is considerably less reliable as a result of deformation of the tip of the finger (see FIG. 11b). Reducing the activation force is also preferred since the foil or equivalent that forms the touch surface is subjected to less strain. These problems have meant that a long, narrow touch surface could not be obtained using known technology. This is possible with the invention, however, thanks to the lower contact pressure.

Yet another advantage with a curved touch surface is that the contact pressure will be more linear, i.e. uniform, as opposed to the known, flat touch surfaces. The linearity results, among other advantages, in that the resolution of the touch surface increases and that a protective layer or membrane can be placed outside the touch surface without the function and/or the resolution of the touch surface being noticeably impaired. This is not possible with known touch surfaces. With known touch surfaces of membrane type, the contact pressure increases the closer one gets to the edge, whereas with the curved touch surface according to the invention the contact pressure is substantially constant in the direction of curvature. This advantage of the invention is clear from a comparison between FIGS. 11a and 11b showing an input device according to the invention and a known touchpad of membrane type, respectively.

In a preferred embodiment the touch surface is longer in the second direction than in the first direction (direction of curvature), and in particular the touch surface may be single-curved about a linear geometric axis parallel with the second direction. In this case the positioning accuracy in the longitudinal direction of the touch surface is determined by the physical extension of the touch surface in longitudinal direction. The positioning accuracy in longitudinal direction will therefore be substantially unchanged in comparison with known flat, uncurved touch surfaces, but since the display is not obscured the accuracy in longitudinal direction can in practice be increased through visual feedback via the display, e.g. with a cursor movement.

According to a particularly preferred embodiment the curved touch surface is arranged in its entirety on the side edge of the apparatus. In this embodiment the touch surface has two parallel longitudinal edges between which the curved touch surface runs, and which longitudinal edges are united with the front side and rear side, respectively, of the apparatus. The advantage of this embodiment is that substantially the whole of the front side can be used for the display unit and the display unit can extend maximally out to the longitudinal edges of the front side.

The touch surface has preferably greater extension in its longitudinal direction than transversely. In particular the breadth of the touch surface in the direction of curvature can be made considerably smaller than the equivalent dimension of the display area of the display unit. The desired ratio between a finger movement on the touch surface and a resultant movement on the display area (proportional feedback) can be achieved in a manner known to one skilled in the art. In particular such an ratio can be considerably greater for movement in the transverse direction of the touch surface. The ratio in longitudinal direction may be 1:1, for instance (absolute feedback), so that a selected position in the longitudinal direction of the touch surface corresponds to a position in the longitudinal direction of the display area lying exactly opposite the position on the touch surface, thereby giving good visual feedback to the user. This good visual feedback ensures that a user can position a cursor or select an area on the display for activation of a desired function in a more quick and reliable manner.

The touch surface need not, but may be, approximately the same length as the corresponding dimension on the display area of the display. Alternatively the touch surface may be somewhat longer than the corresponding dimension of the display area.

The touch surface may be divided in the second direction into two or more areas or fields. The division may be made by constructional means and/or logical means, i.e. solely software-controlled. Division by constructional means might be achieved by means of electrically separated fields that may be produced in one and the same input device with a common touch surface. Two adjacent fields divided by constructional means can, however, be used as a single logically coherent field. A logical division can be achieved with software indicating different pressure surfaces or fields on the touch surface via the display unit.

In general only one position at a time shall be activated on a touch surface, or for each field if the touch surface is divided by constructional means into fields as above.

In one embodiment the touch surface comprises an upper part and a lower part, of which only the upper part—normally controlled by the thumb—is active when the apparatus is held in the user's hand. This avoids the lower part of the touch surface being accidentally activated by the user's palm. The lower part of the touch surface may be used, for instance, for direct control of function buttons in a list, by pressing the correct longitudinal position on the lower part of the touch surface. In other words the upper part of the touch surface can be used for two-dimensional control, whereas the lower part can be used for one-dimensional control.

In known manner the touch surface can also be made sensitive in the direction perpendicular to the touch surface in order to permit activation of various functions, e.g. the feature of being able to click on various buttons on the display. One way of implementing this is to introduce a third foil inside the above-mentioned inner foil. Position control occurs by pressing together the outer and inner foils described above. The click function is achieved by increased pressure so that the inner foil is brought into contact with the third foil. The latter contact can be registered electrically as galvanic closing of a contact. This solution offers a mechanical feedback to the user. The foils may have different stiffness in order to give the user the correct pressure feeling.

Another way to implement activation of functions presented on the display, for instance, is to define that the activation, "clicking", shall occur when the pressure on the touch surface is released.

There are several known ways of achieving detection/determining of the co-ordinates of a depressed position on the touch surface. Known technology uses resistive methods, capacitive methods and methods based on surface waves, for instance. Most preferable are probably methods utilizing a membrane or a foil to form the touch surface.

In accordance with a second aspect of the invention a hand-controlled input device of touchpad type is provided comprising a touch surface that is position-sensitive in a first and a second direction and over which touch surface a user is to pass a finger, and means for sensing the position of the finger on the touch surface, wherein the touch surface is convexly single-curved about a linear geometric axis parallel with said second direction, which input device is characterised in that the touch surface is formed by an outer side of a resilient outer foil having two edges located parallel to said linear geometric axis and at which the resilient outer foil is clamped so that, as a direct result of its striving to assume a flat form, it is tensioned to a convexly single-curved, resilient surface.

One advantage of this aspect of the invention is that the outer foil can be produced and machined to a finished foil in a flat state. The finished foil can then be clamped into the hand-controlled input device and only then acquires its curved shape. The foil can therefore be machined in a relatively simple manner in accordance with known methods for manufacturing foils for flat input devices. If applicable, for instance, the foil may be supplied with suitably shaped layers and conductors by means of printing.

The touch surface is preferably longer in the second direction than in the first direction. The input device may also comprise a curved inner foil arranged inside and spaced from the outer foil. The inner foil may be arranged over an arched base, and preferably secured to this base. To achieve the necessary distance the outer foil may have a greater curvature than the surface against which the outer foil shall be depressed, e.g. the outer side of a curved inner foil. This can be achieved, for example, by making the outer foil somewhat wider in transverse direction and clamping the longitudinal sides of the foils together at the longitudinal edges of the touch surface. The outer foil will then diverge resiliently from the inner foil in order to maintain a distance between the foils, which distance can be reduced by the user pressing his finger on the touch surface. Naturally the distance between the foils can also be influenced by suitable spacers, particularly at the edges.

The outer and inner foils can be made from one and the same foil which is provided with the necessary layers and conductors and thereafter folded around a fold line in order to form both the inner and the outer foil.

The input device with a curved touch surface in accordance with the invention, allows for a narrow touch surface on a limited area. This is not possible with conventional, flat touchpanels. A conventional flat touch-panel has spacer elements requiring the panel to be protected from being touched over a distance of about 2 mm from the spacer elements since a conventional touchpanel is based on the outer foil being stretched down to the inner foil upon activation. Without this safety margin there is a risk of the outer foil being deformed and/or becoming detached from the spacer. Thus, part of the available area is lost, that is to say the area taken up by the spacer elements (in one direction at least 2+2 mm) and also the safety margin of 2+2 mm (see FIG. 11b). An inactive area of 8 mm is naturally unacceptable if the panel is to be made as narrow as 12 mm, for instance. This problem is eliminated in the input device in accordance with the invention since no stretching occurs.

Furthermore, conventional touchpanels cannot be bent to convex form and still retain their function, because the distance to the outer foil will be incorrect.

Thus, in accordance with the invention, a compact, handheld electronic apparatus can be produced, such as a mobile telephone, in which the relatively narrow edge side can be used in an ergonomic manner for entering text, digits, movements and control functions, e.g. of a cursor, two-dimensional objects or two-dimensional images of three-dimensional objects. The possibility of using most of the front side of the apparatus as a display area, without the display area being obscured, while the fingers of one hand can be used to hold the apparatus in a natural manner and the fingers of the same hand used for controlling the apparatus is also provided. This is possible since entering data does not require operation of a separate keyboard or physical buttons on the front side of the apparatus. Instead, the apparatus in accordance with the invention is provided with one or more pressure-sensitive touch surfaces on the narrow edge sides of the apparatus. The possibility is also provided of arranging a touch surface extending along the entire length of the display and in such proximity to the display that extremely good visual feedback is obtained between touch surface and display, without the size of the apparatus being noticeably affected. This means, for instance, that a virtual keyboard can be presented on the screen and pressing of the keys can be quickly and easily controlled by the touch surface.

If the touch surface in its entirety is to be arranged on the side edge of the apparatus, the touch surface may not be wider than the thickness of the apparatus, which may be in the order of 12 mm or less. The length of the touch surface is normally not critical since the whole length of the apparatus is available. Pressing with a finger, particularly a thumb, on a narrow and flat oblong surface with a width of only 12 mm does not offer acceptable accuracy, as well as demanding too much force. However, this problem is solved in accordance with the invention by the touch surface being given a convex shape in its transverse direction.

DESCRIPTION OF THE DRAWINGS

FIG. 5 is a cross section through an input device shown in FIG. 4, FIG. 6 is an enlargement of part of the input device shown in FIG. 5, FIG. 7 illustrates a method for producing an input device in accordance with the invention, FIG. 8 illustrates a method for producing a second input device in accordance with the invention, FIG. 9 is a schematic cross sectional view, not drawn to scale, of the input devices in FIGS. 7 and 8.

FIG. 10 illustrates schematically one aspect of the function of the invention,

DESCRIPTION OF THE PREFERRED EMBODIMENTS

Figure 1:
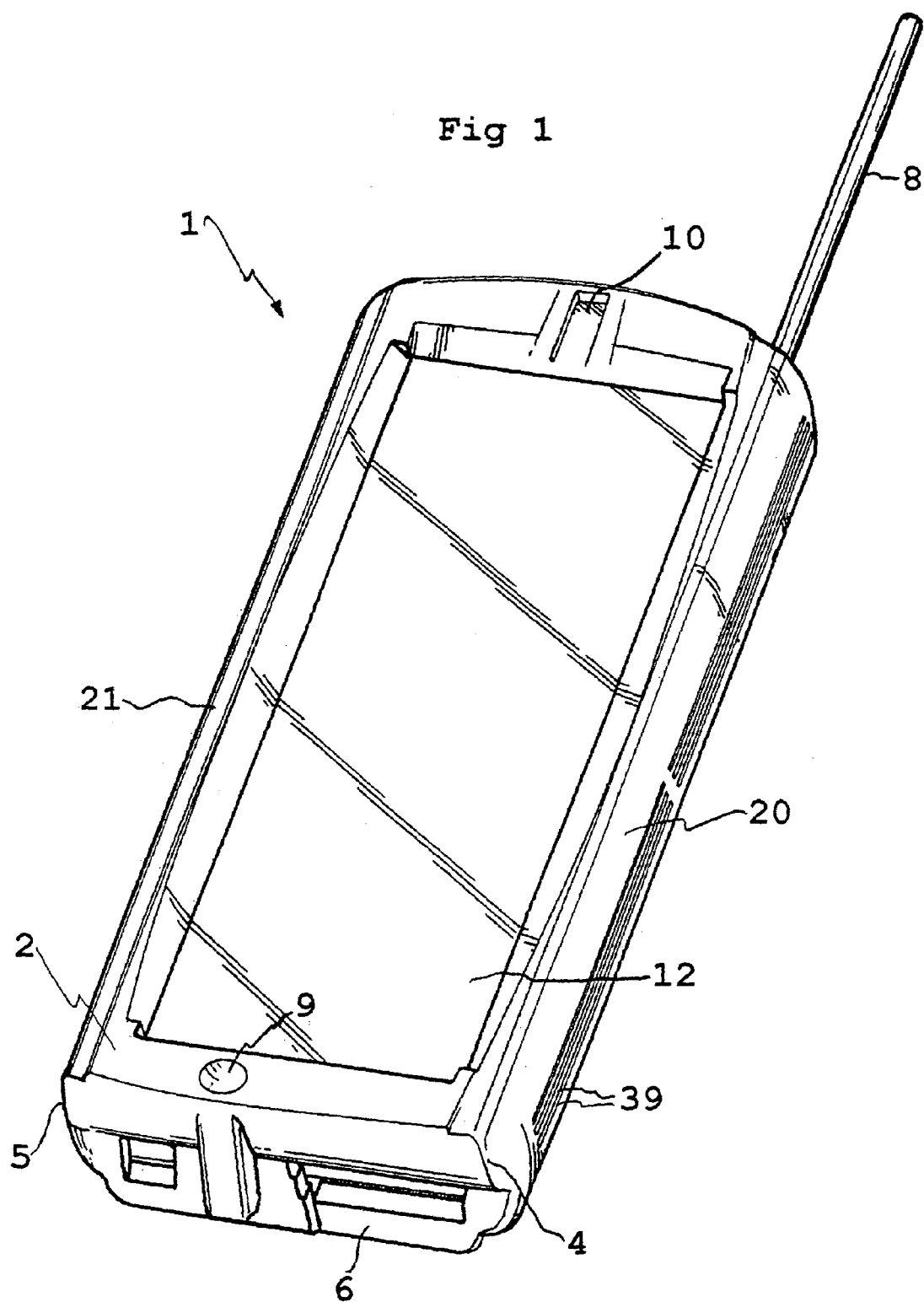
FIG. 1 is a view in perspective of the front side of a mobile telephone, constituting one embodiment of a handheld electronic apparatus in accordance with the invention.
Figure 2:
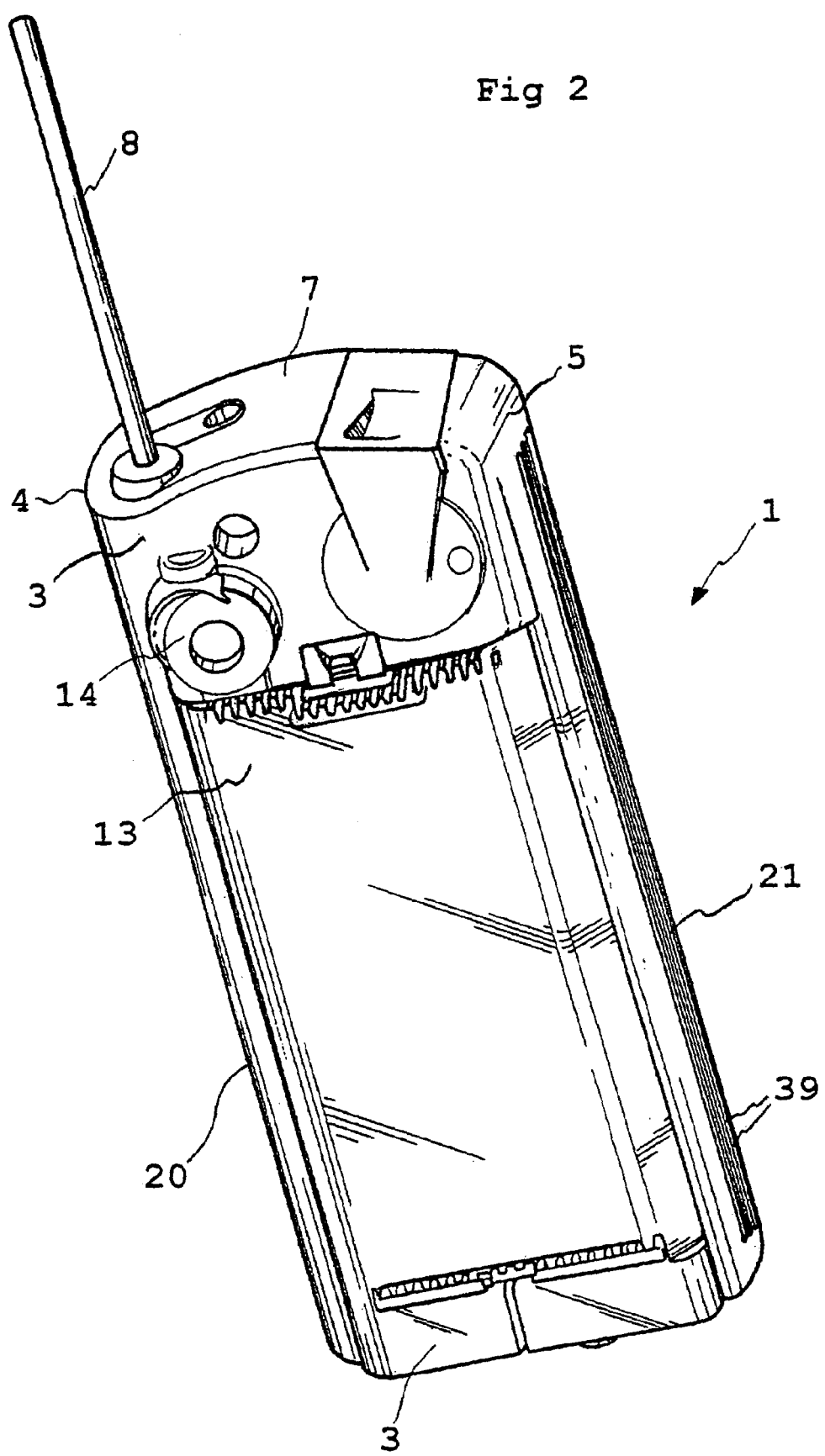
FIG. 2 shows the rear of the mobile telephone in FIG. 1.

A combined mobile telephone/web browser 1 shown in FIGS. 1 and 2 has a front side 2, a rear side 3, two opposite edge sides 4, 5, a bottom side 6 and a top side 7. The mobile telephone 1 is provided with communication means comprising an aerial 8, a microphone 9, a loud-speaker 10 and electronic transceiver circuits, not shown, arranged internally in the apparatus. The latter circuits may be of conventional type and are therefore not described further in detail. A display unit with a rectangular display area 12 is arranged on the front side 2 and a battery compartment 13 is arranged on the rear side 3. Unlike conventional mobile telephones, the display area 12 of the display unit takes up almost the entire front side 2. Only two small areas above and below the display area 12 are free for the loudspeaker 10 and the microphone 9, respectively. The mobile telephone/web browser 1 also comprises electronic circuits (not shown) necessary for various functions, such as processors, display drive units, memory circuits, etc., which are known to those skilled in the art and will not therefore be described in detail. FIG. 2 also shows a camera 14 on the rear side 3, which is in no way necessary for the invention and is therefore not described in further detail.

The mobile telephone 1 is provided with two elongate input devices 20, 21 of "touchpad" type, controlled by the fingers, extending along each edge side 4 and 5, respectively, for controlling the mobile telephone 1 and its display unit. This embodiment comprises two input devices but a simpler embodiment may have only one input device, preferably the input device 20 on the right edge side 4 for control with the thumb of the right hand.

Characteristic of the mobile telephone 1 in this embodiment is that it lacks other input devices in the form of physical keys, thumb-wheel, etc. All activation and control on the part of the user can be performed with the aid of input devices 20, 21.

Figure 3:
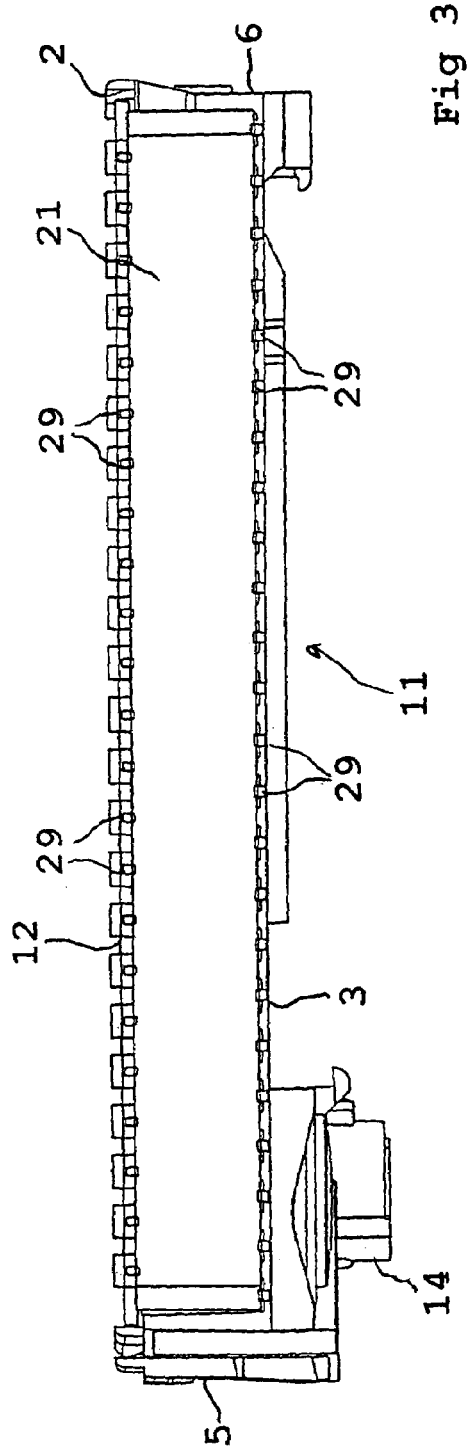
FIG. 3 is a side view of an inner chassis or frame of the mobile telephone in FIG. 1.
Figure 4:
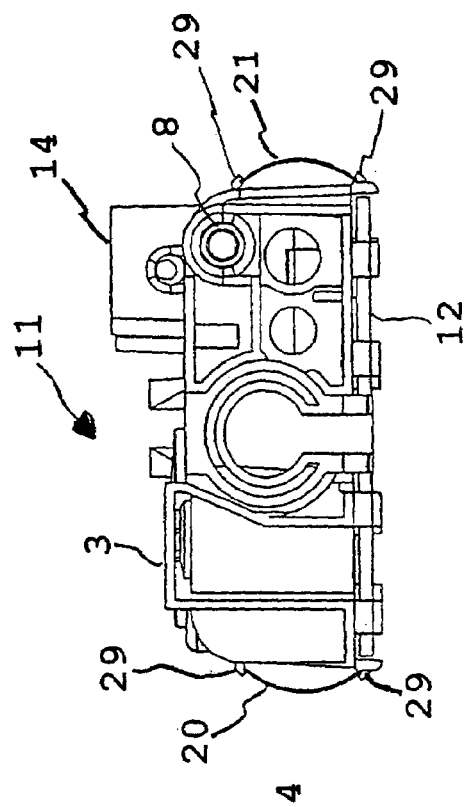
FIG. 4 is a top view of the chassis in FIG. 3.
Figure 11A:
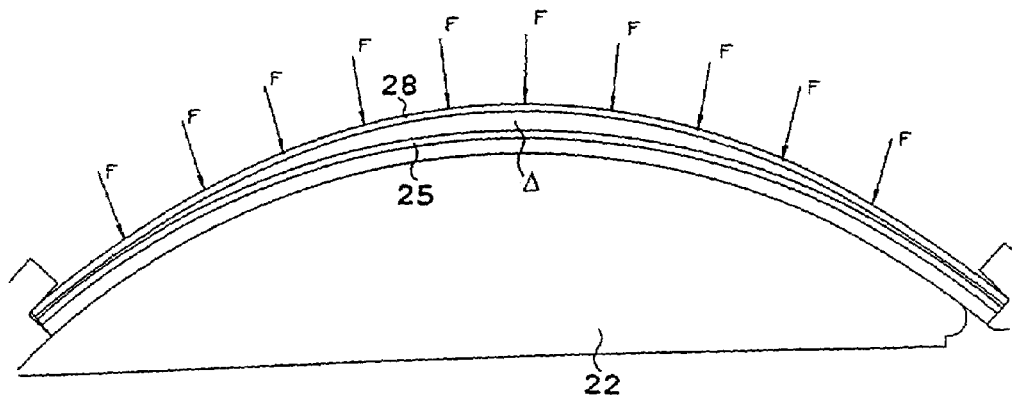
FIG. 11 illustrates schematically a second aspect of the function of the invention.
Figure 11B:
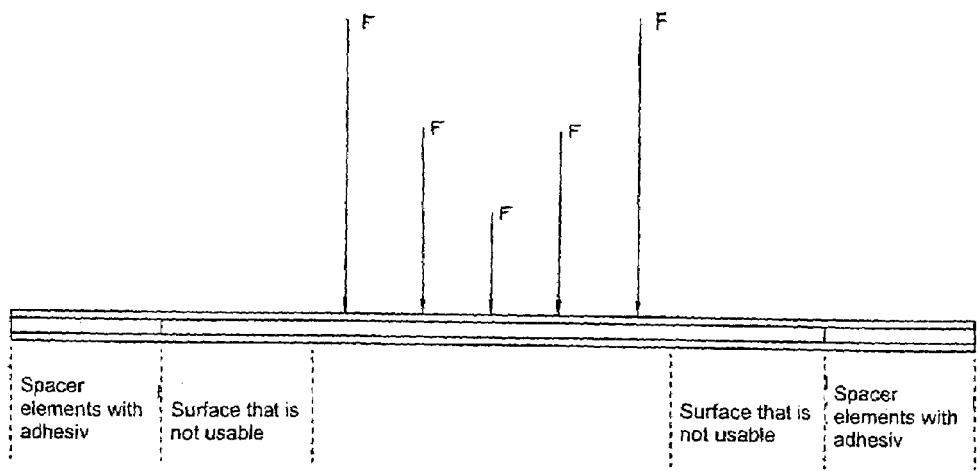

The basic design of the right input device 20 will now be described. The design is substantially the same as for the left input device 21. As shown in FIGS. 5 and 6 the input device 20, observed from the inside, comprises the following three basic components: (i) an elongate base 22 with an arched surface 23 and a rear side 24, (ii) an inner foil 25 and (iii) an outer foil 26. The exterior of the outer foil 26 may form the curved touch surface but in a preferred embodiment it is covered by a flexible outer casing as described below. FIGS. 3 and 4 show the inner chassis 11 of the mobile telephone 1 with the input device in place, but without outer casing or battery.

Figure 12:
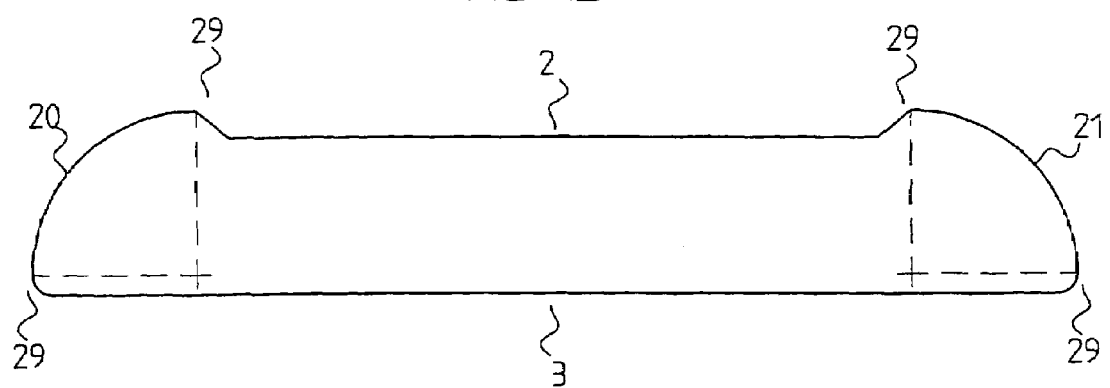
FIG. 12 is a top view of a mobile telephone illustrating an example of how the input device is clamped.

According to the embodiment shown in FIGS. 3 and 4 the input device 20, 21 is arranged on the edge side 4, 5 of the mobile telephone so that the surface of the input device 20, 21 is substantially directed at 90 degrees to a normal of the front side 2. By this is meant the direction corresponding to the normal to a plane stretched between the longitudinal edges of the input device 20, 21. FIG. 12 shows an alternative embodiment where the main direction of the surface of the input device 20, 21 is turned so that it is angled substantially 45 degrees to the normal of the front side 2.

In one embodiment the longitudinal edges of the input device join the front 2 and rear 3 sides, respectively, of the mobile telephone. In another possible embodiment one of said longitudinal edges joins the front or rear side of the mobile telephone, while the other longitudinal edge joins one edge side 4, 5 of the mobile telephone. In yet another feasible embodiment both said longitudinal edges join one edge side 4, 5 of the mobile telephone.

The base 22 shown in FIGS. 5 and 6 is approximately 127 mm long and 13.5 mm wide in the embodiment shown in FIGS. 1-4, these dimensions fitting the dimensions of the side edge 4 of the apparatus. The curved surface 23 has a radius of curvature of approximately 1 cm. The inner foil 25 and outer foil 26 in this embodiment are made of PET plastic foil 0.05 mm in thickness, but other materials and thicknesses can naturally be used. The area of the inner foil 25 coincides with the size of the curved surface 23 of the base 22 and is secured to the curved surface 23 of the base by means of a layer 27 of binder, such as self-adhesive tape. The flat rear side 24 of the base 22 is attached in suitable manner to the edge side 4. In an alternative embodiment the base 22 may instead be integrated with, i.e., constructed in one piece with the chassis 11 shown in FIGS. 3 and 4.

The outer foil 26 is electrically insulated from the inner foil 25 at both long edges 26 by means of strip-like layers of insulating varnish 28 and adhesive. The outer foil 26 is somewhat broader (in the present case approximately 13.9 mm) than the inner foil 25 so that, by being clamped at its longitudinal edges at the designations 29, it is caused to assume a sharper curvature than the inner foil 25. The result is that the outer foil 26 is raised from the inner foil 25 and that a small gap Δ in the order of 0.25 mm is formed between the inner and outer foils at the mid-position P1 and in the order of 0.05 mm at the edge positions P2. This gap Δ is thus achieved without the use of any separate spacer elements. Since the outer foil 26 is resilient the gap Δ can be momentarily eliminated at a point where the user temporarily places a finger. The outer foil 26 need not be stretched in order to make contact with the inner foil 25. The only inactive areas of the touch surface are those above the insulation shoulder 28. When the user releases the finger pressure the gap Δ will be restored as a result of the resilience of the outer foil 26.

For resistive registering of the co-ordinates for a depressed position on the touch surface of the input device, the inner foil 25 and the outer foil 26 are in this embodiment provided in known manner with resistive layers, provided with electrodes, on the sides facing each other, which resistive layers, for instance, are of a graphic mixture.

A method for producing the input devices 20 and 21 will now be described. Reference is first made to FIGS. 7 and 9 in combination, which illustrate schematically the production of the left input device 21 of the mobile telephone. The cross section in FIG. 9 is greatly reduced in horizontal direction and is enlarged in vertical direction. The left input device 20 is intended primarily for use when the apparatus 1 is in horizontal position, e.g. during use as a web browser. It is therefore sufficient for the left input device 20 to be one single input device and not divided into two fields in its longitudinal direction like the right input device 21, as will be described further below.

The upper part of FIG. 7 shows a coherent foil intended to be folded about a longitudinal fold line L in order to form the inner foil 25 and the outer foil 26. Thus, in the finished input device 21, the inner and outer foils are joined at the fold line L (see FIG. 6), whereas the outer foil 26 protrudes slightly outside the inner foil 25 at the opposite edge. Naturally the inner foil 25 and the outer foil 26 do not need to be joined but may instead consist of two separate foils. The lower part of FIG. 7 shows a printed wiring and electrode pattern 30 of silver, for instance, which is applied directly on the unfolded foil 25, 26. The pattern 30 comprises two relatively long x-electrodes 31, located parallel with each other, on the outer foil side 26 and two relatively short y-electrodes 32, located parallel with each other, on the inner foil side 25, for determining the x-position and y-position, respectively, of a point where the user presses with his finger. The electrodes 31 and 32 are connected via conductors to connection terminals 33. Two layers 34, 35 of insulating varnish, Dupont 5018G, are applied on the pattern 30. Two resistive graphic layers 36, 37, respectively, are then applied on these layers. The graphic layers are electrically connected to the electrodes 31, 32, respectively, as shown in FIG. 9, and are insulated from each other. Their width is considerably greater than is indicated in FIG. 9 and corresponds to the extension of the touch surface in transverse direction. When the graphic layers 36, 37 are applied they will come into direct electrical contact with respective electrodes 31 and 32, as shown schematically by thin lines in FIG. 9. Finally the insulating layers 28 are applied on the graphic layers 36 and 37 to keep them insulated from each other at their longitudinal edges where the foil is folded.

The foils 25, 26 with the applied layers and wiring pattern, are then folded around the fold line L so that one foil part 26 is placed on top of the other foil part 25 in order to form the finished input device 20, ready for connection to the drive electronics via connection terminals 33. In the embodiment shown the foils are provided along the fold line L with a number of through-slots 60 and intermediate connections 61 that act as "hinges" during folding and which keep the two foils together. The wiring pattern 30 runs at the outer connections 62.

An advantage of the construction described above is that the resistive layers 36, 37 are arranged like a motorway spaced above the electrodes and conductors, thereby greatly saving space. No separate spacers are required and the construction as a whole is cost-efficient and advantageous from the production aspect.

The right input device 21 is produced in much the same way except that its area is divided in its longitudinal direction into an upper part 21-1 and a lower part 21-2, as indicated in FIG. 8. Each part has two x-electrodes 31 and two y-electrodes 32. Otherwise the manufacturing method is the same. This division allows the lower part 21-2 to be inactivated by suitable software if it is desired to avoid involuntary activation with the palm of the right hand while the upper part 21-1 is being controlled by the thumb of the right hand.

Implementation of the positioning function of the input devices 20, 21 is known per se and need not be described in detail. The resistive layers 36, 37 can be put under voltage by necessary drive circuits alternately with a suitable frequency. When the user presses together the graphic layers 36, 37 at a certain point, the location of the point is determined in two directions by high-ohmic measurement on the layer temporarily not under voltage. This position determining is then used to control the display unit 12, e.g., to control a cursor, for selection of virtual buttons, etc., shown on the display unit 12. The function of the input devices 20,21 in particular can be application-controlled.

The arrangement is preferably also made sensitive to the magnitude of the pressure, this being achieved by resistively determining the magnitude of the depressed effective contact area between the resistive layers 36, 37. When the contact pressure increases, the contact area increases since the finger is deformed. The transition resistance thus falls and a measurement is obtained of how hard one is pressing. This can be used to activate various functions when the correct position has been selected in x and y direction. A click function can also be obtained, as described, with a third foil inside the inner foil (not shown).

As an alternative to the embodiment described above the input devices 20, 21 can be implemented with a matrix system comprising a set of intersecting conductors, e.g. columns on one foil and rows on the other. The depressed position can easily be determined by a scanning process.

As mentioned above, the display unit can be made relatively insensitive to jolts since no flexible touch surface covering the display area 12 is necessary. To make the apparatus even better able to withstand external influence such as moisture and blows, the chassis 11 of the apparatus, with the exception of the display area 12 and battery lid 13, may be covered by a suitable waterproof and/or shock absorbing material, such as a shell of elastomeric material. This shell may particularly cover also the input devices 20,21 and must then be flexible so as not to affect their function. The surface of this shell may be provided with a pattern that can be physically felt above the touch surface of the input devices 20,21, such as the longitudinal ribs 39 shown in FIGS. 1 and 2. Such a pattern could also be arranged directly on the exterior of the outer foil 26. This shell may also be integrated with a transparent protective foil or plate covering the display area 12. Should this transparent surface become scratched it can then easily be replaced by replacing the shell with integrated, transparent protective foil or plate.

What is claimed is:

1. A handheld or pocketsized electronic apparatus comprising a display unit and a touch surface that is position-sensitive in a first and a second direction for control of the electronic apparatus, wherein the apparatus has a front side and an edge side distinct from the front side, and the display unit has a display area taking up a majority of the front side of the apparatus, and the touch surface is arranged on the edge side of the apparatus and is curved in the first direction to convex shape.

2. An apparatus as claimed in claim 1, wherein the touch surface is longer in the second direction than in the first direction.

3. An apparatus as claimed in claim 1 or claim 2, wherein the touch surface is single-curved about a linear geometric axis parallel with the second direction.

4. An apparatus as claimed in claim 1, further comprising a rear side, and wherein the touch surface is arranged in its entirety on the edge side of the apparatus and has two parallel longitudinal edges between which the curved touch surface runs, and which longitudinal edges are united with the front side and rear side, respectively, of the apparatus.

5. An apparatus as claimed in claim 1, wherein the touch surface is arranged in its entirety on the side edge of the apparatus and has two parallel longitudinal edges between which the curved touch surface runs and wherein at least one of said longitudinal edges is united with the edge side of the apparatus.

6. An apparatus as claimed in claim 1, wherein the extension of the display area in the direction corresponding to positioning in the first direction of the touch surface is greater than the extension of the touch surface in the first direction.

7. An apparatus as claimed in claim 6, wherein the extension of the display area in the direction corresponding to positioning in the second direction of the touch surface is substantially equivalent to the extension of the touch surface in the second direction.

8. An apparatus as claimed in claim 1, wherein the touch surface is divided in the second direction into at least two part-surfaces.

9. An apparatus as claimed in claim 1, further comprising a second edge side opposite said edge side, and wherein the curved touch surface constitutes a first curved touch surface and the apparatus has a second curved touch surface, and wherein the first curved touch surface and the second curved touch surface are arranged on opposite edge sides of the apparatus.

10. An apparatus as claimed in claim 1, wherein the curved touch surface is convexly single-curved about a linear geometric axis parallel with said second direction and wherein the touch surface is formed by an outer side of a resilient outer foil having two edges located parallel to said linear geometric axis and at which the resilient outer foil is clamped so that, as a direct result of its striving to assume a flat form, it is tensioned to a convexly single-curved, resilient surface.

11. A hand-controlled input device comprising a touch surface that is position-sensitive in a first and a second direction and over which touch surface a user is to pass a finger, and means for sensing the position of the finger in said two directions on the touch surface, wherein the touch surface is convexly single-curved about a linear geometric axis parallel with said second direction, wherein the touch surface is formed by an outer side of a resilient outer foil having two edges located parallel to said linear geometric axis and at which the resilient outer foil is clamped so that, as a direct result of its striving to assume a flat form, it is tensioned to a convexly single-curved, resilient surface.

12. An input device as claimed in claim 11, wherein the touch surface is longer in the second direction than in the first direction.

13. An input device as claimed in claim 11, also comprising a curved inner foil arranged inside and spaced from the outer foil.

14. An input device as claimed in claim 13, wherein the outer foil has greater curvature than the inner foil.

15. An input device as claimed in either of claims 13 or 14, wherein the outer foil has greater extension in its transverse direction than the inner foil, so that it is brought into a relative distance from the inner foil when the foils are clamped to the convex form along their opposite longitudinal edges.

16. An apparatus as claimed in claim 1, wherein the apparatus is a mobile telephone.

17. A handheld or pocketsized electronic apparatus comprising a display unit and a touch surface that is position-sensitive in a first and a second direction for control of the electronic apparatus, wherein the apparatus has a front side and an edge side distinct from the front side, and the display unit has a display area taking up a majority of the front side of the apparatus, and the touch surface is arranged on the edge side of the apparatus and is curved in the first direction to convex shape and wherein the majority of the curved touch surface is arranged on the edge side of the apparatus and a minor part of the curved touch surface is arranged on the front side of the apparatus.

* * * * *